United States Patent
Lougheed et al.

(10) Patent No.: US 8,768,577 B2
(45) Date of Patent: Jul. 1, 2014

(54) IMPLEMENT INTERFACE DISPLAY

(75) Inventors: Christopher Wayne Lougheed, Litchfield, MN (US); Spencer Lee Mindeman, West Fargo, ND (US)

(73) Assignee: Clark Equipment Company, West Fargo, ND (US)

(*) Notice: Subject to any disclaimer, the term of this patent is extended or adjusted under 35 U.S.C. 154(b) by 89 days.

(21) Appl. No.: 12/773,437

(22) Filed: May 4, 2010

(65) Prior Publication Data

US 2011/0276222 A1 Nov. 10, 2011

(51) Int. Cl.
*G06F 19/00* (2011.01)
*E02F 9/26* (2006.01)
*G05B 19/042* (2006.01)
*G06F 17/00* (2006.01)
*E02F 3/43* (2006.01)
*E02F 3/46* (2006.01)
*E02F 9/22* (2006.01)

(52) U.S. Cl.
CPC ............ *E02F 9/26* (2013.01); *G05B 19/0423* (2013.01); *G05B 2219/2663* (2013.01); *G05B 2219/23068* (2013.01); *G06F 17/00* (2013.01); *E02F 3/435* (2013.01); *E02F 3/46* (2013.01); *E02F 9/2296* (2013.01)
USPC ........................................... 701/50; 701/33.4

(58) Field of Classification Search
CPC ............ E02F 9/26; E02F 3/435; E02F 3/46; E02F 9/2296; G05B 19/0423; G05B 2219/2663; G05B 2219/23068; G06F 17/00
USPC ............ 701/50, 33.4, 36; 414/723, 703, 685, 414/687, 722, 726; 700/83, 90, 85, 56; 125/13.03, 12; 37/414; 172/2; 111/101
See application file for complete search history.

(56) References Cited

U.S. PATENT DOCUMENTS 5,957,213 A * 9/1999 Loraas et al. ............. 172/2
6,061,617 A 5/2000 Berger et al.
6,144,910 A 11/2000 Scarlett et al.
(Continued)

FOREIGN PATENT DOCUMENTS

WO 0020989 A1 4/2000
WO 2008054624 A1 5/2008
WO 2009025772 A1 2/2009

OTHER PUBLICATIONS

Search Report and Written Opinion dated Aug. 10, 2011 for International application No. PCT/US2011/034942, filed May 3, 2011.
(Continued)

*Primary Examiner* — Marthe Marc-Coleman
(74) *Attorney, Agent, or Firm* — John D. Veldhuis-Kroeze; Westman, Champlin & Koehler, P.A.

(57) ABSTRACT

A power machine having an operator interface is disclosed. The power machine has a frame, an engine supported by the frame, and a cab supported that defines an operator compartment. The power machine provides an auxiliary power source capable of providing auxiliary power to an implement that is operably coupled to the power machine. Control input devices that are actuable by an operator provide signals indicative of actuation thereof. The implement is in communication with the power machine. The operator interface is accessible within the operator compartment for providing operational information related to control of the implement to the operator. The operator interface receives signals related to the provided operational information that are communicated by the implement.

23 Claims, 12 Drawing Sheets

(56) References Cited

U.S. PATENT DOCUMENTS

| | | | |
|---|---|---|---|
| 6,343,237 B1* | 1/2002 | Rossow et al. | 700/83 |
| 6,542,789 B2 | 4/2003 | Ufheil | |
| 6,928,353 B2 | 8/2005 | Finley et al. | |
| 7,099,722 B2* | 8/2006 | Casey | 700/85 |
| 7,539,570 B2* | 5/2009 | Normann | 701/50 |
| 2004/0024510 A1 | 2/2004 | Finley et al. | |
| 2005/0102865 A1* | 5/2005 | Bell et al. | 37/195 |
| 2008/0188954 A1* | 8/2008 | Thomson et al. | 700/17 |
| 2009/0055057 A1* | 2/2009 | Osborn | 701/50 |

OTHER PUBLICATIONS

Communication dated Feb. 17, 2014 in European Application No. 11731160.5, filed Jun. 21, 2013, 6 pages.

* cited by examiner

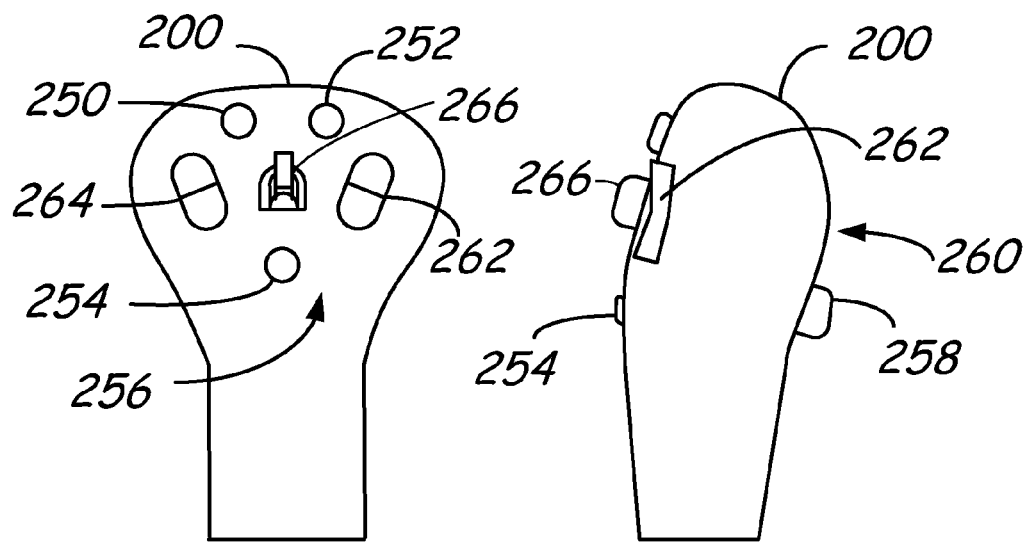
FIG. 6A          FIG. 6B
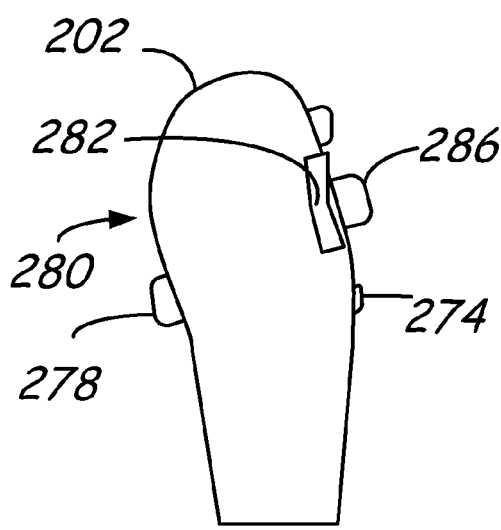     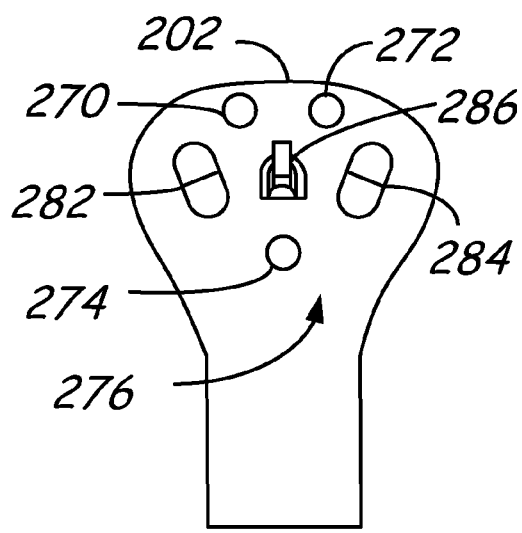
FIG. 6C          FIG. 6D

IMPLEMENT INTERFACE DISPLAY

FIELD OF THE DISCLOSURE

The present discussion is related to communicating instructional information to an operator of a self-propelled power machine. More particularly, the present discussion is related to communicating operational information for controlling an implement that is operably coupled to a self-propelled power machine.

BACKGROUND

Self-propelled power machines such as loaders are capable of performing a variety of tasks, including digging, carrying material, leveling terrain, pushing snow, and the like. In addition, there are a number of different work implements such as graders, planers, powered brooms, augers, to name only a few, that can be operably coupled to a power machine to increase the functionality and versatility of the power machine. Such work implements are configured to perform functions that are not otherwise performed by the power machine. For example, an auger is capable of employing a power source from the power machine to rotate an auguring tool, which in turn can, for example, auger holes into soil or other materials. As a result, power machines are increasingly used in a variety of applications and environments. Such machines typically have an operator compartment, in which an operator can sit and manipulate control devices to operate the power machine and control functions that are performed by a work implement that is operably coupled to the power machine.

Increasingly, different types of work implements with multiple functions are capable of being operably coupled to power machines. Work implements with one or more controllable work functions are often advantageously controlled by converting a signal indicative of an operator's manipulation of control devices into a control signal that can be used to control the one or more functions on a given work implement. With the ever-expanding number of multiple function work implements that can be attached to a power machine, it is desirable to provide an operator with interfaces that facilitate control of such implements. Such interfaces facilitate the increased realization of power machine functionality by employing any number of work implements, as desired.

SUMMARY

In one illustrative embodiment, a power machine having an operator interface is discussed. The power machine has a frame, an engine supported by the frame, and a cab supported by the frame that defines an operator compartment. An auxiliary power source that is capable of providing power to an implement that is operably coupled to the power machine is included. Control input devices that are actuable by an operator provide signals indicative of actuation thereof. The implement is in communication with the power machine. The operator interface is accessible within the operator compartment for providing operational information related to control of the implement to the operator, wherein the operator interface receives signals related to the provided operational information communicated by the implement.

In another illustrative embodiment, an implement configured to be attached to a power machine is discussed. The implement is capable of performing a task and receives a power source from the power machine to perform the task. The implement includes a communication device that communicates signals related to implement operational information that are receivable by an operator interface for providing the operational information to an operator.

In yet another illustrative embodiment, a method of providing implement operational information to an operator is discussed. The method includes communicating information related to the operational status of an implement from the implement to an operator interface remote from the implement.

BRIEF DESCRIPTION OF THE DRAWINGS

FIGS. 6A-B are front and side views of a handle located within an operator compartment of the work machine of FIG. 1 having a plurality of user manipulable input devices for controlling functions on a work implement coupled to the work machine according to one illustrative embodiment.

FIGS. 6C-D are front and side views of a handle located within an operator compartment of the work machine of FIG. 1 having a plurality of user manipulable input devices for controlling functions on a work implement coupled to the work machine according to one illustrative embodiment.

DETAILED DESCRIPTION

Figure 1:
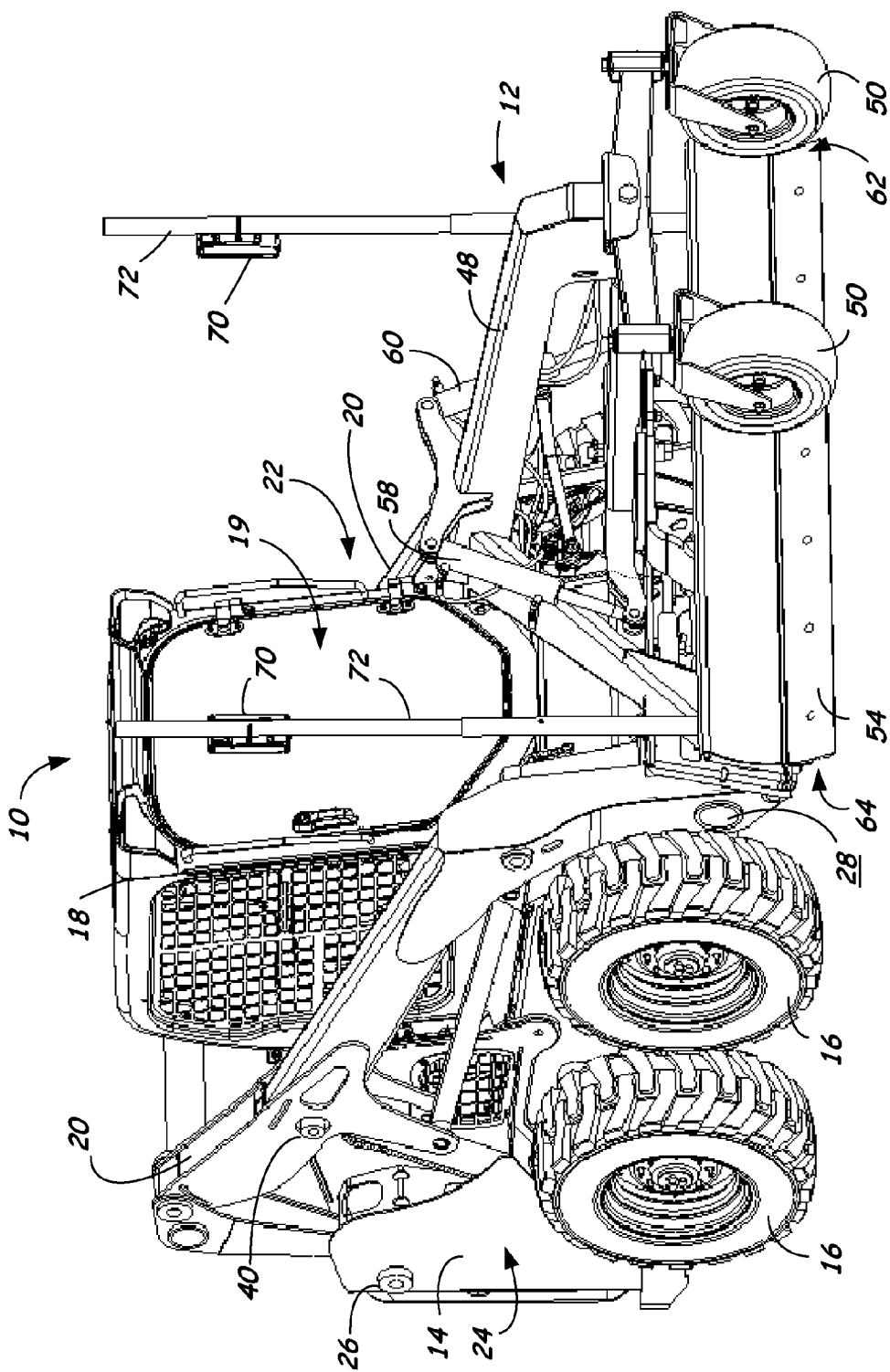
FIG. 1 is a perspective view illustrating a power machine of the type that is useful to employ the embodiments of the present discussion with a grader operably coupled thereto.
Figure 2:
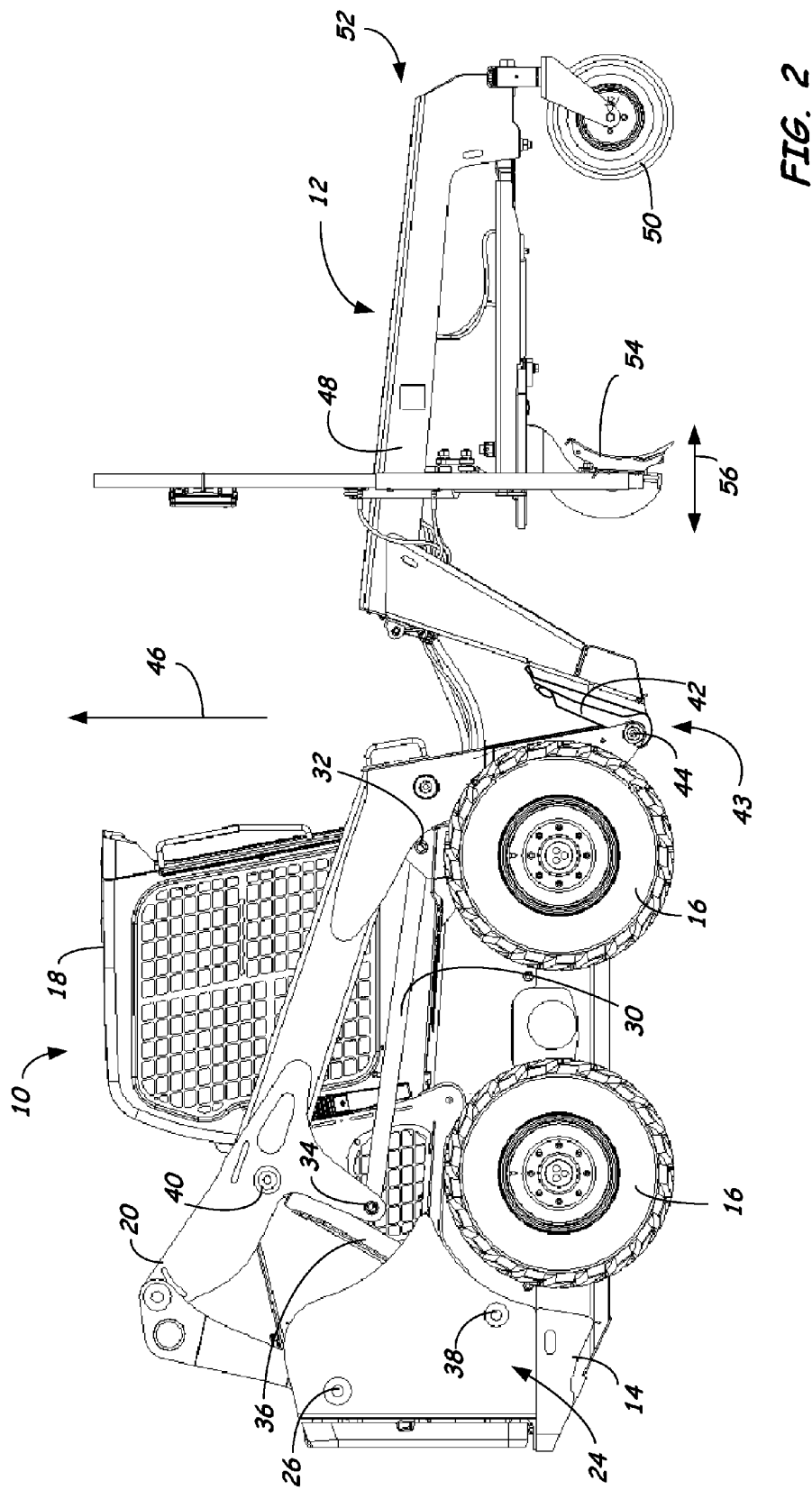
FIG. 2 is a side elevation view illustrating the power machine and grader of FIG. 1.

FIGS. 1 and 2 illustrate a power machine 10 with a work implement 12 operably coupled thereto of the type that is useful for employing the embodiments discussed in the current disclosure. The power machine 10 shown in FIGS. 1 and 2 is a skid steer loader and the work implement 12 is a grader. However, it should be appreciated that the embodiments be advantageously employed on other power machine and work implements. For example, the power machine 10 can be a mini excavator, wheeled or tracked loader, utility vehicle, all-wheel steer loader, or a walk behind loader, to name a few. Similarly, examples of work implements 12 that can employ the embodiments discussed herein include powered brooms, tree spades, snow blowers, wheel saws, stump grinders, backhoes, dozer blades, chippers, cement mixers, planers, soil conditioners, and hand held tools such as chain saws. Thus, while the embodiments discussed below are related to a skid steer loader with a grader coupled thereto, other combinations of power machines and implements are contemplated.

Power machine 10 includes a frame 14 that is supported by wheels 16. Power machine 10 has an engine (not shown), which supplies power to the wheels 16 causing the power machine 10 to move under the control of an operator. Frame 14 supports a cab 18, which defines an operator compartment 19 in which an operator can sit and control the power machine 10 and implement 12 via control devices that are operable by the operator's hands and/or feet. Power machine 10 also includes a pair of lift arms 20, with one of the lift arms 20 disposed on each of a first side 22 and a second side 24 of the power machine 10. The lift arms 20 are each pivotally attached to the frame at lift arm mounting locations 26 and are coupled to each other via a cross member that is connected to the lift arm 20 at location 28 on each lift arm (only one location 28 is shown in FIGS. 1 and 2). In addition, a link 30 is rotatably coupled to the frame 14 and each lift arm 20 and at mounting locations 32 and 34, respectively, on each of the first side 22 and the second side 24 of the power machine 10. Only the link 30 on the second side 24 is shown. A pair of actuators 36 (only one is shown) is each pivotally attached to the frame 14 and to one of the lift arms 20 at mounting locations 38 and 40, respectively. In one illustrative embodiment, the actuators 36 are hydraulic cylinders. An implement carrier 42 is pivotally coupled to the lift arms 20 at a pair of pivot points 44 (only one of which is shown) proximal to an end 43 of the lift arms 20. The implement carrier 42 is capable of accepting and securing the power machine 10 to any number of work implements, including the grader 12 illustrated in FIGS. 1 and 2. The lift arms 20 of power machine 10 are configured such that extension and retraction of actuators 36 causes the lift arms 20 to raise and lower the pivot points 44 and, by extension, the end 43 of the lift arms 20 along a generally vertical path illustrated by arrow 46. It should be appreciated that other lift arm configurations may cause the pivot points 44 to travel along other paths while the lift arms 20 are raised or lowered. For example, some power machines have lift arm configurations cause the end of its lift arms(s) to travel along a generally arcuate path.

The grader 12 includes a frame 48 that is configured to be accepted by the implement carrier 42 and be coupled to the power machine 10. A pair of caster wheels 50 is attached to frame 48 and supports the frame 48 at a distal end 52 of the grader 12. A blade 54 is attached to the frame 48. The blade 54 is capable of rotational movement in a fore and aft direction indicated by arrow 56. An actuator coupled to the grader 12 (not shown in FIGS. 1 and 2) is capable of being actuated to control the fore and aft rotational movement of the blade 54.

In addition, a pair of actuators 58 and 60 is operably coupled to the frame 48 and the blade 54 to control the height of the blade relative to a support surface. Each of the actuators 58 and 60 are capable of being operated independently of one another to raise and/or lower a first side 62 and a second side 64 of the blade 54, respectively. Thus, the blade 54 can be adjusted so that the blade 54 is angled with respect to a horizontal plane of the grader 12. In other words, the blade 54 can be controlled to adjust not only the height, but the horizontal attitude of the blade 54.

In one embodiment, an operator has access to manipulate control devices within the operator compartment that can be used to control the height and rotational movement of the blade 54. In addition, grader 12 in some embodiments also includes a laser guidance system, which operates to provide automated control of the height of the blade 54 by controlling actuators 58 and 60. The laser guidance system provides height control to maintain the height of the blade 54 despite changes in the terrain over which the grader is traversing. Maintaining the height of the blade 54 includes, in one embodiment, maintaining a consistent horizontal attitude or, alternatively in some embodiments, adjusting the horizontal attitude. Alternatively still, the laser guidance system can allow for maintaining or adjusting the horizontal attitude, as desired. Control signals that indicate an operator's desire to manipulate the height and/or the rotational angle of the blade 54 and the automated laser guidance system will be discussed in more detail below.

Figure 3:
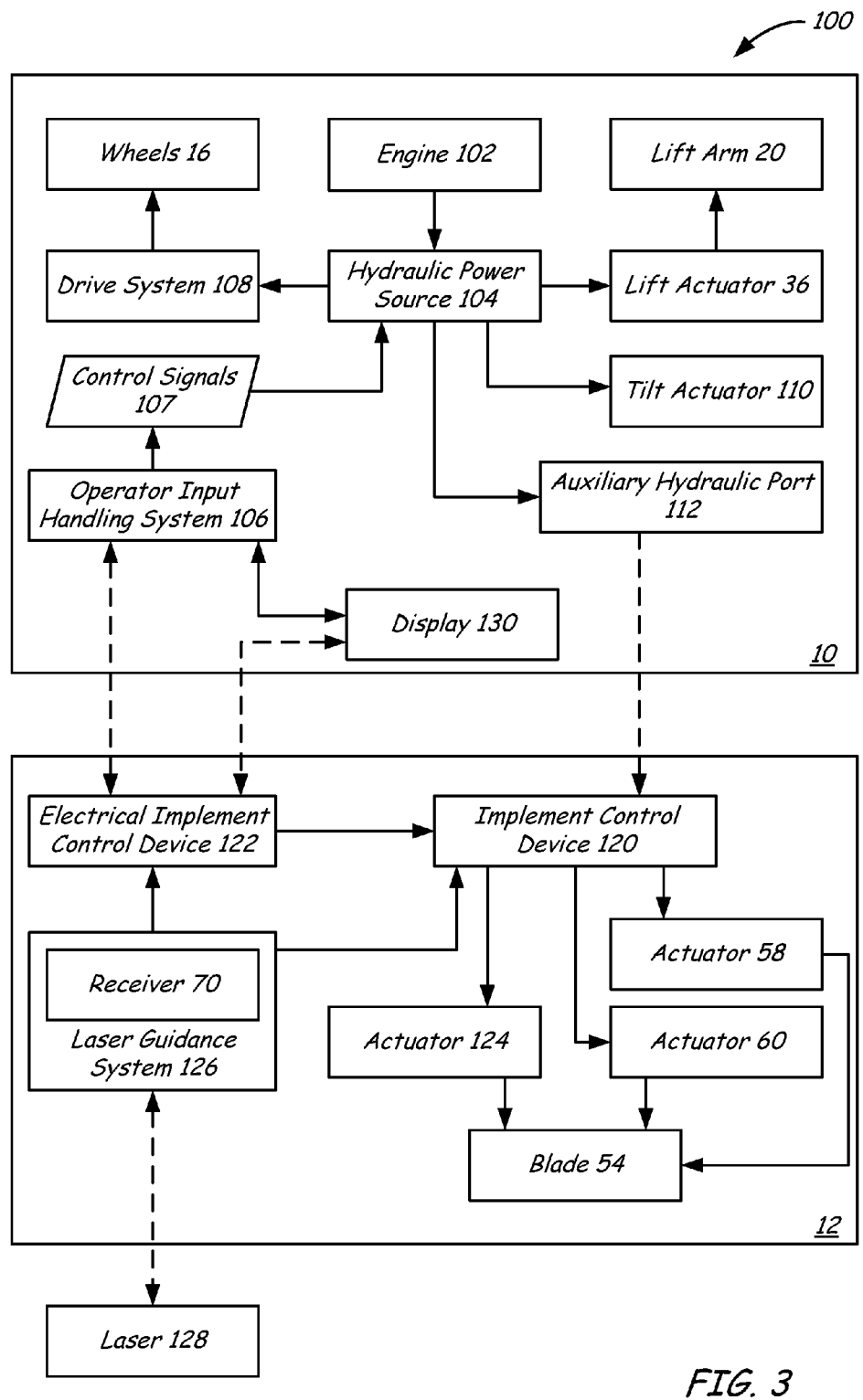
FIG. 3 is a block diagram illustrating a control system for controlling a work implement such as the grader of FIG. 1 that is operably coupled to a power machine according to one illustrative embodiment.

FIG. 3 is a block diagram that illustrates one example of a control system 100 that can be employed to control various functions of the power machine 10 and the grader implement 12 combination illustrated in FIGS. 1 and 2. Control system 100 illustratively includes an engine 102 located on power machine 10, which provides power to a hydraulic power source 104. The hydraulic power source 104 illustratively includes one or more hydraulic pumps, which provide pressurized hydraulic fluid to hydraulic loads, as discussed below. In addition, the hydraulic power source 104 includes control mechanisms that can be manipulated to port pressurized hydraulic fluid from the one or more pumps to hydraulic work loads, as desired. Examples of control mechanisms include hydraulic valves, which port oil from a pump to hydraulic loads and pump actuation devices, which directly control the flow of hydraulic fluid from a hydraulic pump.

Operator input handling system 106 includes devices that can be manipulated by an operator and are operably coupled to the hydraulic power source 104 to provide control signals 107 to the hydraulic power source 104. In addition, the operator input handling system 106 is capable communicating with a display 130 to send and/or receive information. The display 130 provides information to an operator. In one embodiment, the display 130 provides information related to the operation of the power machine 10 and related activities, such as operation of an attached implement, as is discussed in more detail below.

The control signals 107 illustratively cause control mechanisms coupled to the hydraulic power source 104 to be manipulated to cause hydraulic fluid to be provided to a drive system 108, which provides power to the wheels 16. The drive system 108 is but one example of a hydraulic work load referenced above. The control signals provided to various control mechanisms are, in various embodiments, electrical signals, hydraulic signals, mechanical signals, or some combination thereof. Alternatively, other types of signals may be used to communicate indications of operator manipulations of control devices. In one embodiment, the drive system 108 includes a pair of drive motors, each of which are coupled to both wheels 16 on a side of the power machine. Other drive motor arrangements may be employed to power the wheels 16. The hydraulic drive system 108 is also referred to as a hydrostatic drive system.

In addition, the hydraulic power source 104 is capable of providing hydraulic fluid to a plurality of other hydraulic devices on the power machine 10. For example, the hydraulic power source 104 illustratively provides fluid to the hydraulic lift actuators 36, which control the position of the lift arms 20. Further, the hydraulic power source 104 provides hydraulic fluid to one or more hydraulic tilt actuators 110, which, when actuated, cause the implement interface 42 to rotate about the pivot point 44. Further still, the hydraulic power source 104 provides hydraulic fluid to an auxiliary hydraulic port 112, which is made available to implements such as the grader 12. While the system 100 illustratively includes an engine and hydraulic components, it should be appreciated that other systems that include devices other than those described in system 100 can be employed with the embodiments discussed herein. For example, mechanical or electrical components can be employed in place of one or more of the hydraulic components discussed in system without departing from the scope of the present discussion.

As the control system 100 illustrated in FIG. 3 is described as being employed to control various functions of the power machine 10 and grader 12, it should be appreciated that system 100 includes components that are part of the grader 12. Furthermore, while one skilled in the art will recognize that system 100 can perform functions that are substantially independent of any functions that include grader 12 examples of which are discussed above, this discussion focuses on those functions that are dependent on grader 12 from this point forward. The portion of the control system 100 resident on the grader 12 includes an implement control device 120, which is illustratively connected to the auxiliary hydraulic port 112 to receive hydraulic fluid from the machine 10. The implement control device 120 is capable of providing the hydraulic fluid to components on the grader 12 to manipulate the position of the blade 54. As discussed above, a pair of actuators 58 and 60 is capable of being actuated to raise and lower the first side 62 and the second side 64 of the blade 54, respectively. In one illustrative embodiment, the implement control device 120 includes a plurality of hydraulic valves that are actuable to provide hydraulic fluid to cause the actuators 58 and 60 to expand or contract as desired to position the blade 54 at a desired height and angle relative to a support surface that supports the grader 12. In addition, the implement control device 120 is actuable to cause an actuator 124 to expand or contract, resulting in the fore and aft rotational movement of the blade 54 as discussed above.

The grader 12 also illustratively includes an electrical implement control device 122, which is capable of being in wired or wireless electrical communication with the power machine 10 to receive electrical signals from the power machine 10 that are indicative of inputs being actuated by an operator. In some embodiments, the electrical implement control device 122 is in electrical communication with the operator input handling system 106. In addition, in some embodiments, the electrical implement control device 122 is in electrical communication with the display 130. The electrical implement control device 122 is illustratively in communication with and capable of providing signals to the implement control device 120 that control the position of the plurality of hydraulic control valves that are part of the implement control device 120. The hydraulic control valves in turn control the position of the actuators 58, 60, and 124 and therefore the height and rotational position of the blade 54.

In one illustrative embodiment, the operator input handling system 106 includes handles that have input devices capable of being manipulated that provide signals indicative of a desire by the operator to change the position of the blade 54.

An illustrative example of handles that are advantageously part of the operator input handling system 106 is discussed in more detail below. Additionally, the grader 12, in one embodiment, includes a laser guidance system 126, which includes a pair of receivers 70 that are mounted to the grader 12. Returning again to FIG. 2, the receivers 70 are illustratively mounted to a pair of poles 72 that extend from the blade 54 so that the receivers 70 move with the blade 54. The receivers 70 are capable of detecting a laser 128 positioned at a location remote from the power machine 10 and grader 12. The position of the receivers 70 relative to the laser 128 is calculated by the laser guidance system 126 and the position information is provided to the electrical implement control device 122. The position of each of the receivers 70 is illustratively used by the electrical implement control device 122 to determine whether either or both of the first side 62 and the second side 64 of the blade 54 should be raised or lowered. The laser guidance system 126 thus provides fine control of the position of the blade 54. A desired position for each of the receivers 70 (and therefore the desired positions of the first and second sides 62 and 64 of the blade 54 about which the laser guidance system 126 works to provide fine tuning of the height of the blade 54) is illustratively calculated based on a value stored in and/or accessed by the electrical implement control device 122. By comparing the actual positions of the receivers 70 to their calculated desired positions, the laser guidance system 126 can then cause signals to be sent to the implement control device 120 to raise or lower one or both of the first side 62 and the second side 64 of the blade 54.

Figure 4A:
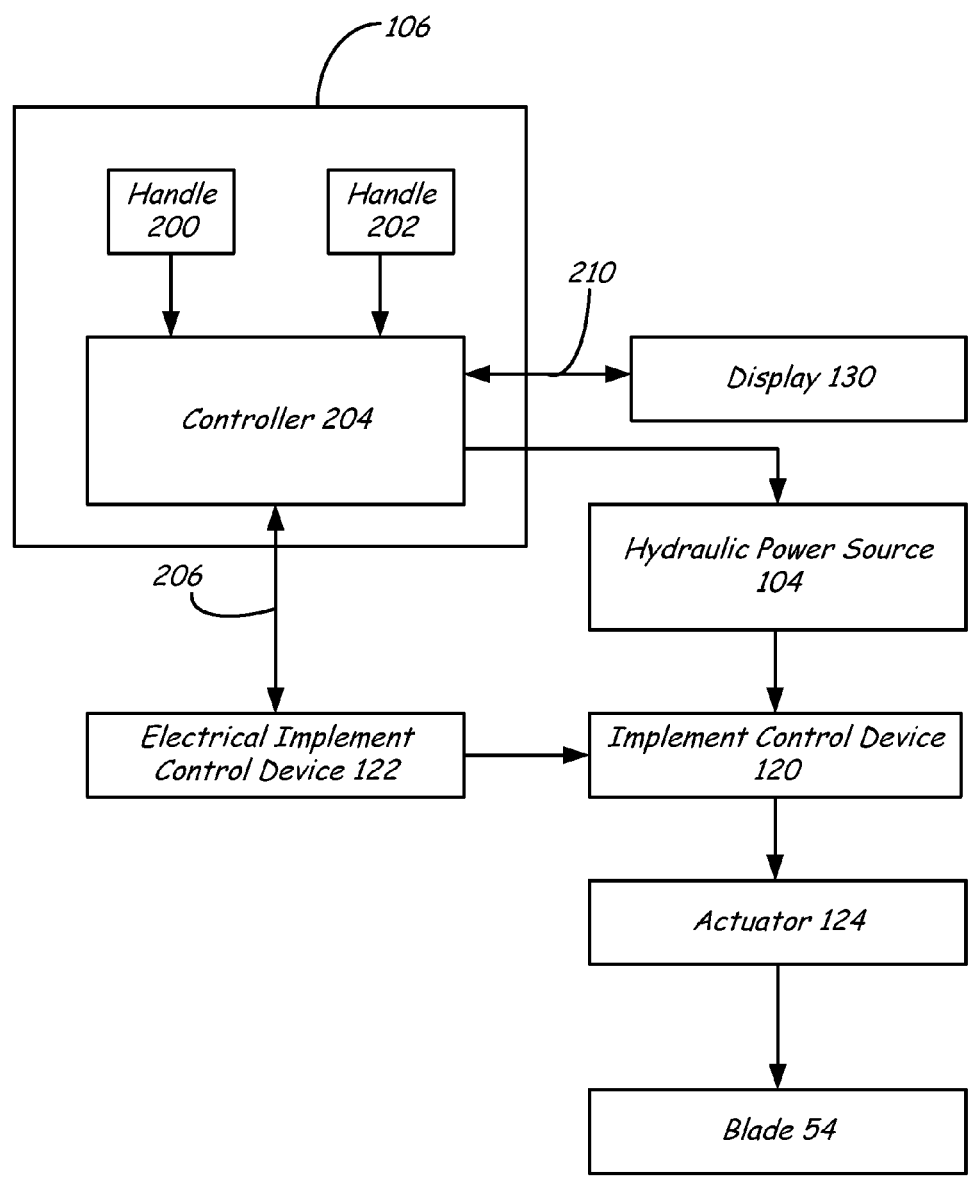
FIG. 4A is a block diagram illustrating an exemplary electrical control and information system for receiving inputs from an operator and displaying operating information to the operator of a power machine of the type illustrated in FIG. 1.
Figure 5:
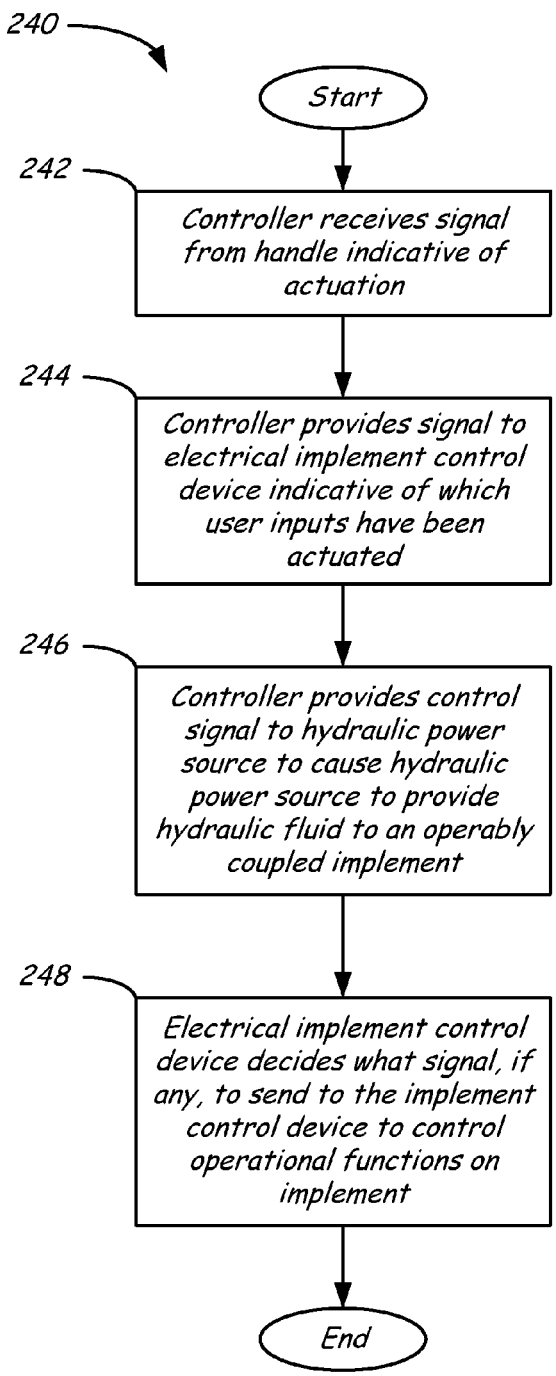
FIG. 5 illustrates a method for handling input signals received from input devices according to one illustrative embodiment.

As discussed above, the operator input handling system 106 illustratively include input devices that an operator can manipulate to control the operation of the grader 12 or any other implement that has multiple control functions. FIG. 4A illustrates one embodiment of the operator input handling system 106, including a pair of input devices 200 and 202 in more detail according to one illustrative embodiment and FIG. 5 illustrates a method 240 for handling input signals received from the input devices 200 and 202.

The input devices 200 and 202 are, in one embodiment, handles that have a plurality of actuable devices that are accessible by an operator for controlling an implement. It should be appreciated that not every implement has as many features to be controlled as there are actuable devices on the handles 200 and 202. Furthermore, it is to be appreciated that because different implements have different functions, each of the actuable devices may control a variety of different types of functions, depending on the implement that is coupled to the power machine. It should also be appreciated that due to the large number of unique work implements, it is infeasible to have input devices dedicated to controlling functions on one and only one work implement. Thus, the same actuable input devices are used to control different functions when different work implements are attached to the power machine.

When an actuable input device on one of the handles 200 and 202 is actuated by an operator, a signal indicative of the actuation is provided to the controller 204. This is illustrated in block 242 of FIG. 5. The controller 204 then provides a signal to the electrical implement control device 122, indicating which actuable device had been actuated. This is illustrated in block 244. In addition, the controller 204, in some embodiments, also provides a signal to the hydraulic power source 104 to provide hydraulic fluid to the implement when certain actuable devices have been actuated. This is illustrated in block 246. In some embodiments, the electrical implement control device 122 provides a signal to the controller 204 indicative of what signal, if any should be sent to the hydraulic power source 104.

Applying method 240 to the power machine 10 and 12 of FIG. 1, when an operator wishes to rotate the blade 54 by actuating the proper actuable device, the controller 204 receives a signal from one of the input devices 200 or 202 indicative of the operator's actuation. The controller 204 communicates a signal via communication link 206 to the electrical implement control device 122 that indicates which actuable device has been actuated. The electrical implement control device 122 then sends a signal via communication link 206 to the controller 204, which indicates what signals should be sent to the hydraulic power source 104. The controller 204 then provides a signal to the hydraulic power source 104 to allow hydraulic fluid to be ported to the implement control device 120 on the grader 12, as needed. In addition, the electrical implement control device 122 provides signals to the implement control device 120 to cause hydraulic fluid to flow to actuator 124 thereby causing actuator 124 to move and rotate the blade 54 in response to the operator's actuation input.

Of course, the grader 12 is but one of a plurality of different types of implements. While a particular operator may be familiar with how certain implements are controlled, that operator may wish to operate one or more different implements attached to power machine 10 without having any particular knowledge of how the implements in question are to be controlled. For example, an operator may not be familiar with how to control a grader with actuable devices on the handles 200 and 202. In one illustrative embodiment, display 130 is in communication with controller 204 and is configured to receive information relative to the operation of the grader 12. Because of the large and always increasing number of implements that can be operably coupled to, and controlled by, power machine 10, it can be difficult to store data in the display 130 or the controller 204 for all of the available implements. More particularly, it may be difficult to keep up-to-date data indicative of instructional information for a universe of implements that are capable of being operably coupled in the display 130 or controller 204.

According to one illustrative embodiment, the electronic implement control device 122 includes information related to displaying instructional information on the display 130. Referring to the embodiment illustrated in FIG. 4A, the electrical implement control device 122 is in communication with controller 204, but is not in direct communication with the display 130. Thus, information related to the type of implement is provided to the controller 204, which in turn is communicated to the display 130. Thus, the controller 204 acts as a gateway between the implement and the display. In one illustrative embodiment, the communication link 206 is a wired serial controller area network (CAN) communication link and the communication link 210 is a separate wired serial CAN communication link. Alternatively, the communication link 206 and the communication link 210 are a single serial CAN bus. In such an embodiment, the electrical implement control device 122 is capable of communicating directly with the display 130 to provide instructional information to the display without employing the controller 204 as a gateway. In yet another alternative embodiment, the electrical implement control device 122 and the display 130 are capable of wireless communication so that information related to the display of operational instruction can be passed via wireless communication.

As discussed above, the grader 12 includes a laser alignment system, which provides fine control of the height of the blade 54 without input from the operator. More particularly, the laser alignment system is capable of providing minor corrections to the height of either or both sides of the blade 54. The preferred position, which includes information related to the height and/or horizontal attitude, of the blade 54 is illustratively stored in the electric implement control device 122. However, it may be advantageous to adjust the preferred height of the blade 54 from time to time during operation of the power machine 10. In one illustrative embodiment, the display 130 is a programmable display that provides information to the operator regarding the preferred height of the blade 54, when the height of the blade 54 is being controlled by the laser guidance system. Operable input devices are provided that are keyed to menu options displayed on the display 130.

Figure 4B:
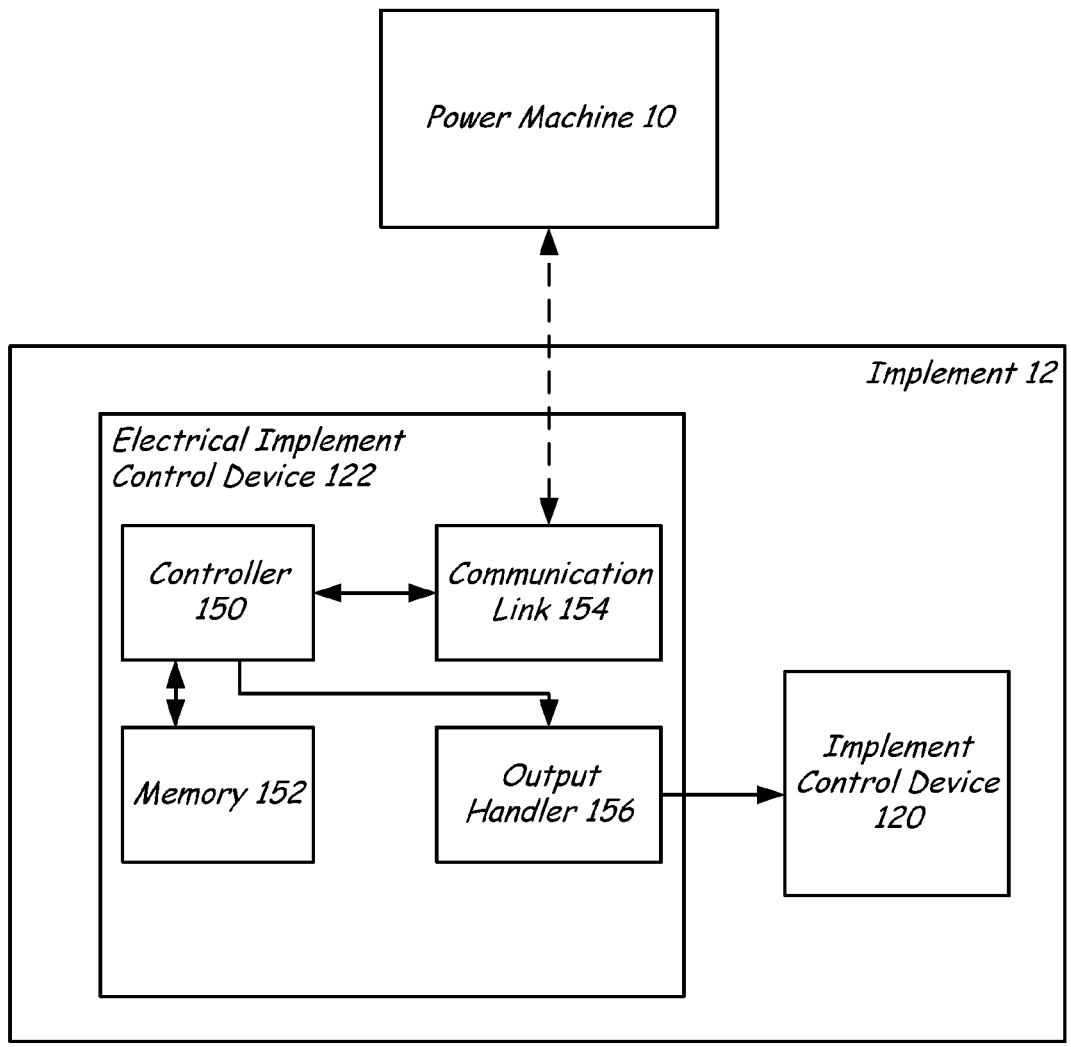
FIG. 4B is a block diagram illustrating components of an exemplary electrical interface control device on a work implement of the type reference in FIG. 3 according to one illustrative embodiment.

FIG. 4B illustrates the electrical interface control device 122 in more detail according to one illustrative embodiment. Electrical interface control device 122 includes a controller 150, which is capable of executing instructions to perform various tasks. The electrical interface control device 122 also includes memory 152. Memory 152 illustratively includes both volatile and non-volatile memory. The controller 150 is capable of accessing the memory 152 to retrieve instructions to be executed as well as stored data such as data that may be communicated via communication link 206. In addition, the controller 150 can access memory 152 to store data in the memory 152. Some examples of information that can be stored in memory 152 will be discussed in more detail later. Electrical interface control device 122 also includes communication link 154, which is operably coupled with components on power machine 10 when the implement 12 is coupled to the power machine 10 to communicate information between the power machine 10 and the electrical interface control device 122. Likewise, the electrical interface control device 122 includes output handler 156, which provides control signals to the implement control device 120. In some embodiments, the output handler 156 includes one or more power drivers, which are capable of controlling an electromechanical device such as a valve or solenoid in the implement control device 120. Alternatively, the output handler 156 can provide electrical signals to devices on the implement control device 120, which in turn directly control electromechanical devices.

FIGS. 6A-6D are illustrations showing multiple views of handles 200 and 202 that have a plurality of operable input devices according to one illustrative embodiment. The handles 200 and 202 are, in one embodiment, positioned in the operator compartment so that the handle 200 is advantageously operable with the left hand of the operator and handle 202 is advantageously operable with the right hand of the operator. Handle 200 includes a number of operable input devices, each of which is capable of providing a signal indicative of whether it has been actuated. It should be appreciated that either handle 200 and 202 can have any number of input devices and that the particular configurations shown in FIGS. 6A-6D are for illustrative purposes only. Handle 200 has three two position switches 250, 252, and 254 located on a main face 256 of the handle 200. A fourth two-position switch 258 is located on an opposing face 260 of the handle 200. The two position switches 250, 252, 254, and 256 are illustratively single pole, single throw momentary switches. The handle 200 also includes two generally vertically aligned three-position switches, an inside switch 262 and an outside switch 264. The inside switch 262 is positioned closer to the middle of the operator compartment than the outside switch 264 when the handle is positioned in the operator compartment 19. Handle 200 also includes a middle rocker input device 266. In one embodiment, the rocker-input device 264 is a three position single throw, double pole momentary switch with a spring loaded center position. Alternatively, the rocker-input device 266 is a variable output device.

Handle 202 likewise includes three two position switches 270, 272, and 274 located on a main face 276 of the handle 202. A fourth two-position switch 278 is illustratively positioned on an opposing face 280 of the handle 202. Each of the two position switches are single pole, single throw momentary switches. Handle 202 also includes a pair of vertically aligned three position switches, an inside switch 282 and an outside switch 284. Each of these switches is illustratively a three-position single throw, double-pole momentary switch with a spring loaded center position. Handle 202 also includes a middle rocker input device 286. In one embodiment, rocker input device 286 is a center loaded, variable output device, although alternatively, the rocker input device 286 is a three position single pole, double throw center biased switch.

Figure 7:
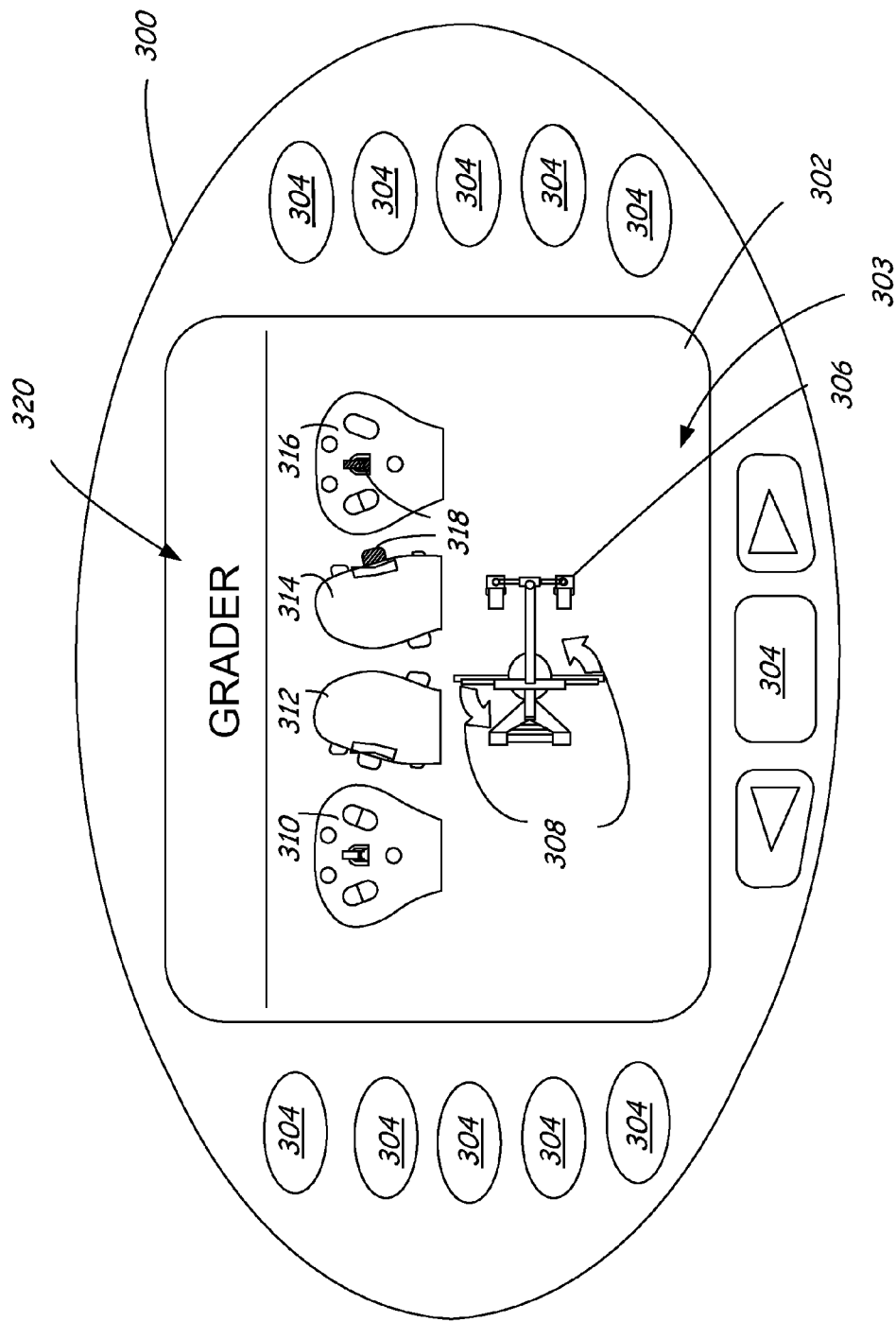
FIG. 7 is an illustration of a display panel displaying an exemplary instructional page related to operation of a work implement operably coupled the power machine of FIG. 1 according to one illustrative embodiment.

FIG. 7 provides an illustration of a display panel 300 suitable for use with power machine 10 according to one illustrative embodiment. The display panel 300 illustratively includes a microprocessor (not shown) that interfaces with a programmable display screen 302 to control the information shown thereon. In addition, a plurality of operable input devices 304 are positioned proximal to the display screen 302 and are operably coupled to the microprocessor to provide signals indicative of whether any of the operable input devices 304 are being actuated. The operable input devices 304 are advantageously capable of allowing, for example, an operator to navigate a structure of display pages on the display screen 302. Alternatively, or in addition, the operable input devices 304 can provide indications of an operator's desire to provide information through the display panel 300. Examples of an operator providing information through the display panel 300 will be discussed below. The display panel 300 is, in one embodiment, capable of communicating with other electronic devices, such as electrical implement control device 122 and controller 204 to receive information to be displayed on display screen 302. In addition, the display 300 is capable of sending signals indicative of operator actuation of operable input devices 304 to one or more modules such as electrical implement control device 122 or controller 204.

The display screen 302 is capable of providing visual images to an operator for the purpose of providing operational instruction related to an implement that is operably coupled to the power machine. In addition, a plurality of operable input devices 304 are positioned proximal to the display screen 302. The operable input devices 304 are associated with the display screen 302 and provide signals to the microprocessor to control the information provided on the display screen 302 and/or receive inputs from an operator based on prompting shown on the display screen 302.

The display screen 302 shown in FIG. 7 depicts a page 303 of information for the operator. It is to be appreciated that the term page in this context is used to describe the example of information illustrated in FIG. 7 on the display screen. However, the term page should not be understood, in this context, to infer any with regard to how display 300 handles the displaying of such information on display screen 302. The page 303 provides instructional information that includes an identification section 320, which identifies a work implement that is coupled to the power machine 10, in this case, the word "GRADER" is provided. The page 303 also provides operational information specific to the operation of the grader 12. As discussed above, the work implements are primarily controlled via the operable inputs located on the handles 200 and 202. The page 303 illustratively provides graphical and/or textual information for identifying which switches control which functions. One of the functions of the grader that is controllable is the rotational movement of the blade.

Page 303 has an icon 306 that represents a grader. The icon 306 has arrows 308 that represent instruction related to the rotational control of the grader blade. Page 303 also has a plurality of icons 310, 312, 314, and 316, which represent the handles 200 and 202 illustrated in FIGS. 6A-6D. Icon 314 and 316 are illustratively two views of the handle 202, including representations of the various operator inputs located on handle 202. Icons 314 and 316 illustrate a shaded switch 318, which corresponds to the rocker input device 286 on handle 202 and indicates that actuation of the rocker input device 286 controls the fore and aft rotation of the blade. As discussed above, the grader allows the operator to control the height of the blade. Subsequent screen images provide similar information related to which switches on the handles are actuated to control the height of the blade. The instructional information, shown here as graphical information alternatively includes textual information or a combination of graphical and textual information.

Figure 8:
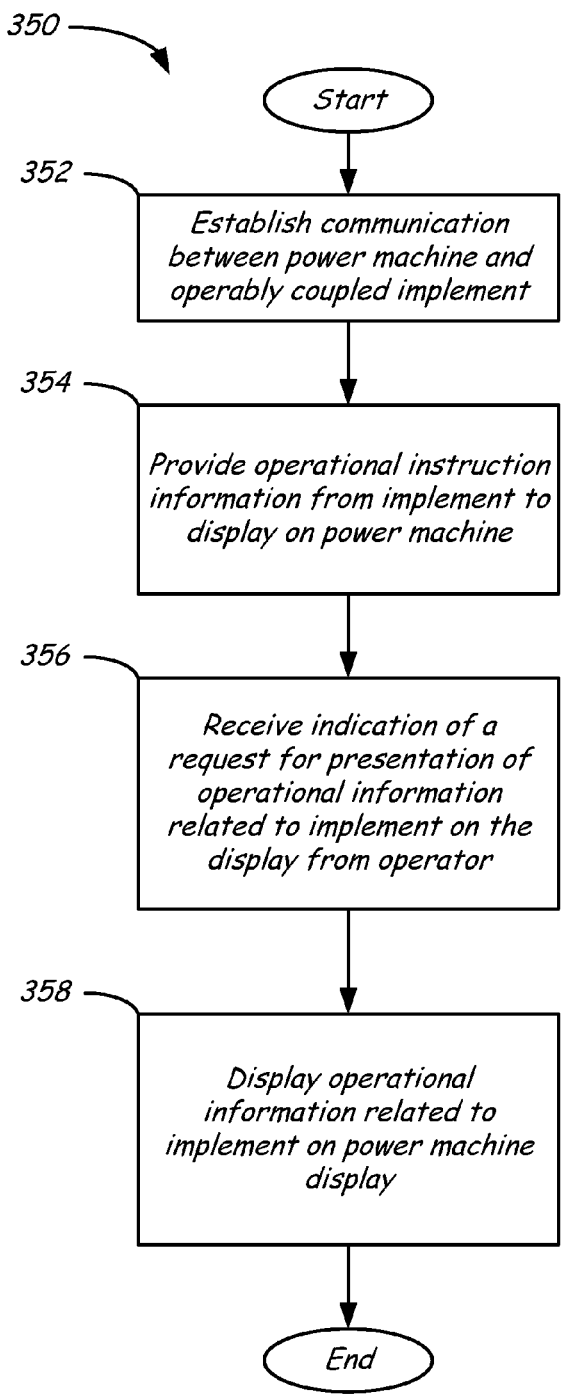
FIG. 8 is a flowchart illustrating a method of interacting via a display on the power machine with a user to provide operational information related to control of the work implement to the operator according to one illustrative embodiment.

FIG. 8 illustrates a method 350 for providing the instructional information related to the operation of a work implement to an operator of a power machine via a display such as display 300 discussed above. At block 352, communication is established between the power machine and an implement that is operably coupled thereto. In one embodiment, communication is initiated by the electrical implement control device 122 with either or both of the controller 204 or the display 130 of FIG. 4A. Alternatively, communication is initiated by either of the controller 204 or the display 130.

Once communication is established between the power machine and the work implement, information related to operational instruction is provided from the work implement to the power machine. This is illustrated in block 354. In one embodiment, the information is communicated shortly after communication is established between the machine and the work implement. In such a case, the information is stored in a non-volatile memory device resident in either the controller 204 or the display 130 and is accessed when an operator signals the desire to receive instructional information. When an operator wishes to access information, the operator manipulates a particular one of the operable input devices 304 designated to allow an operator to communicate the desire to access the operational information. An indication of such a manipulation of the operable input device 304 is then received by the display 300, as is represented in block 356. The display 300 then displays operational information on the display screen 302. This is represented in block 358. As mentioned above, in one embodiment, display information is provided from the implement to the display 300 when communication is established. Alternatively, the operational information is communicated only in response to a request for information to be displayed on the display screen 302 from the operator.

Figure 9:
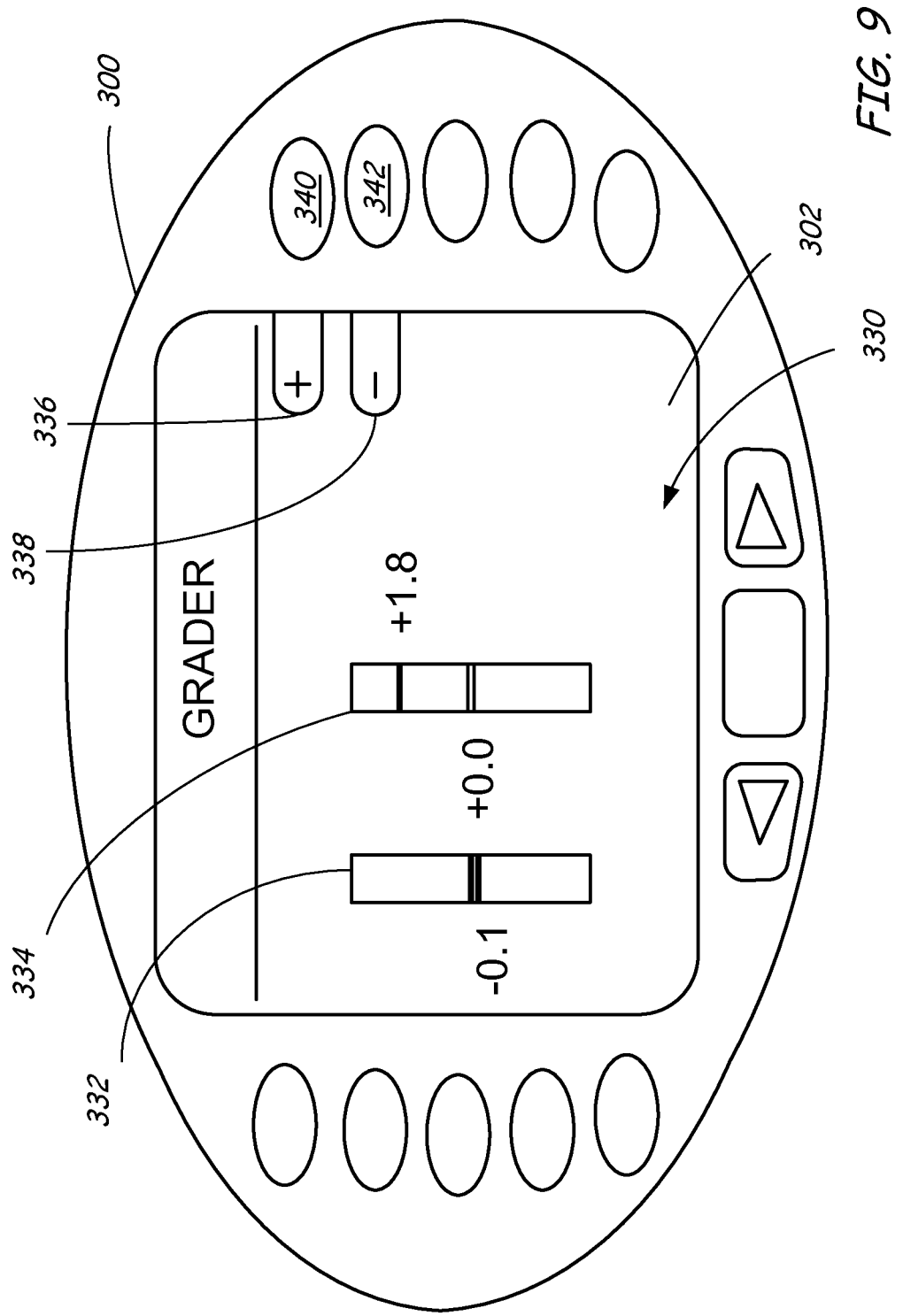
FIG. 9 is an illustration of a display panel displaying an exemplary page related to receiving operational parameter information related to control of a work implement operably coupled the power machine of FIG. 1 according to one illustrative embodiment.
Figure 10:
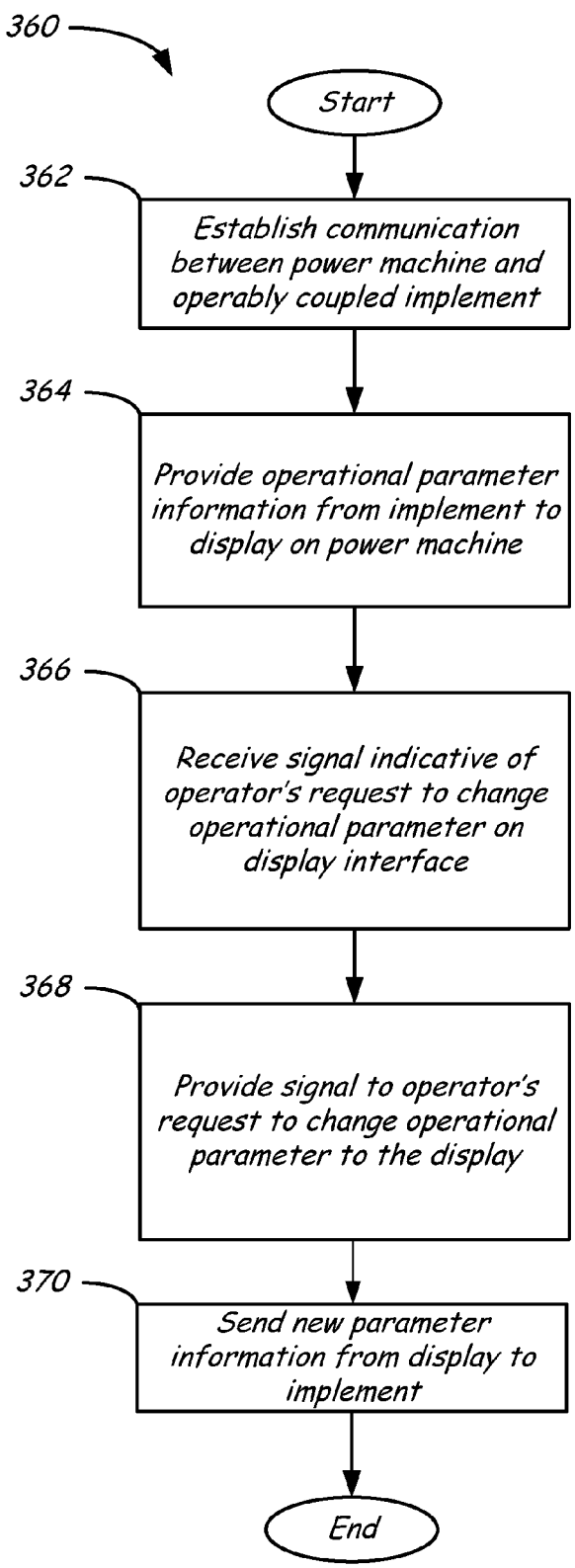
FIG. 10 is a flowchart illustrating a method of interacting via a display on the power machine with a user to obtain operational parameter information related to the work implement from the user according to one illustrative embodiment.

In addition to providing operational information, the display 300 is, in some embodiments, employed to prompt an operator to provide information that is germane to the operation of a given implement. FIG. 9 illustrates display 300 with a page 330 that provides an illustrative example of information provided to an operator to prompt for input related to the operation of an implement and FIG. 10 illustrates a method 360 for prompting for and receiving such input from an operator. When an implement is coupled to the power machine 10, communication between the power machine and the implement is established. This is illustrated in block 362. As with method 350 above, communication between the implement and the power machine can be established between the electrical implement control device 122 and the controller 204 as illustrated in FIG. 4A or alternatively, with the additional communication link between the implement control device 122 and the display 130 (or, as illustrated in FIG. 9, display 300). Once communication is established, information is provided from the electrical implement control device 122 to the display, either directly or through the controller. This is illustrated in block 364. The display 300 then displays information related to an operational parameter to the operator. This is illustrated in block 366. As an example, page 330 illustrates a screen that prompts an operator to adjust set points associated with the laser guidance system 126.

Page 330 illustrates a pair of bar graphs 332 and 334, which illustrate set points for each side of blade 54 as it relates to the laser guidance system 126. In addition, a pair of indicators 336 and 338 is positioned on the display screen proximal to operable input devices 340 and 342. The display screen 302 thus provides information related to the positioning of first 62 and second 64 sides of blade 54. In one illustrative embodiment, the page 330 is shown to the operator in response to inputs provided by the operator. For example, the display in some embodiments, has a menu driven structure and inputs from the operator in the form of actuation of actuation operable input devices cause the operator to navigate the display structure until page 330 is displayed. Alternatively, the page 330 can be provided to the operator once communication between the implement and the display is established.

The operator can adjust the set points by actuating one or both of the operable input devices 340 and 342. In one embodiment, actuation of one of the operable input devices 340 and 342 adjusts set point for each of the first 62 and second 64 sides of the blade 54. In alternative embodiments, the set points are individually and independently adjusted via actuation of operable input devices such as those identified as 340 and 342. When the operator actuates the operable input devices 340 and/or 342, a signal is provided to the display 300 indicative of the operator's request to change an operational parameter. This is illustrated in block 368. Once changes have been identified, the new parameter information is communicated from the display 300 to the electrical implement control device 122 for storage therein and use by the laser guidance system 126. This is illustrated by block 370.

Figure 11:
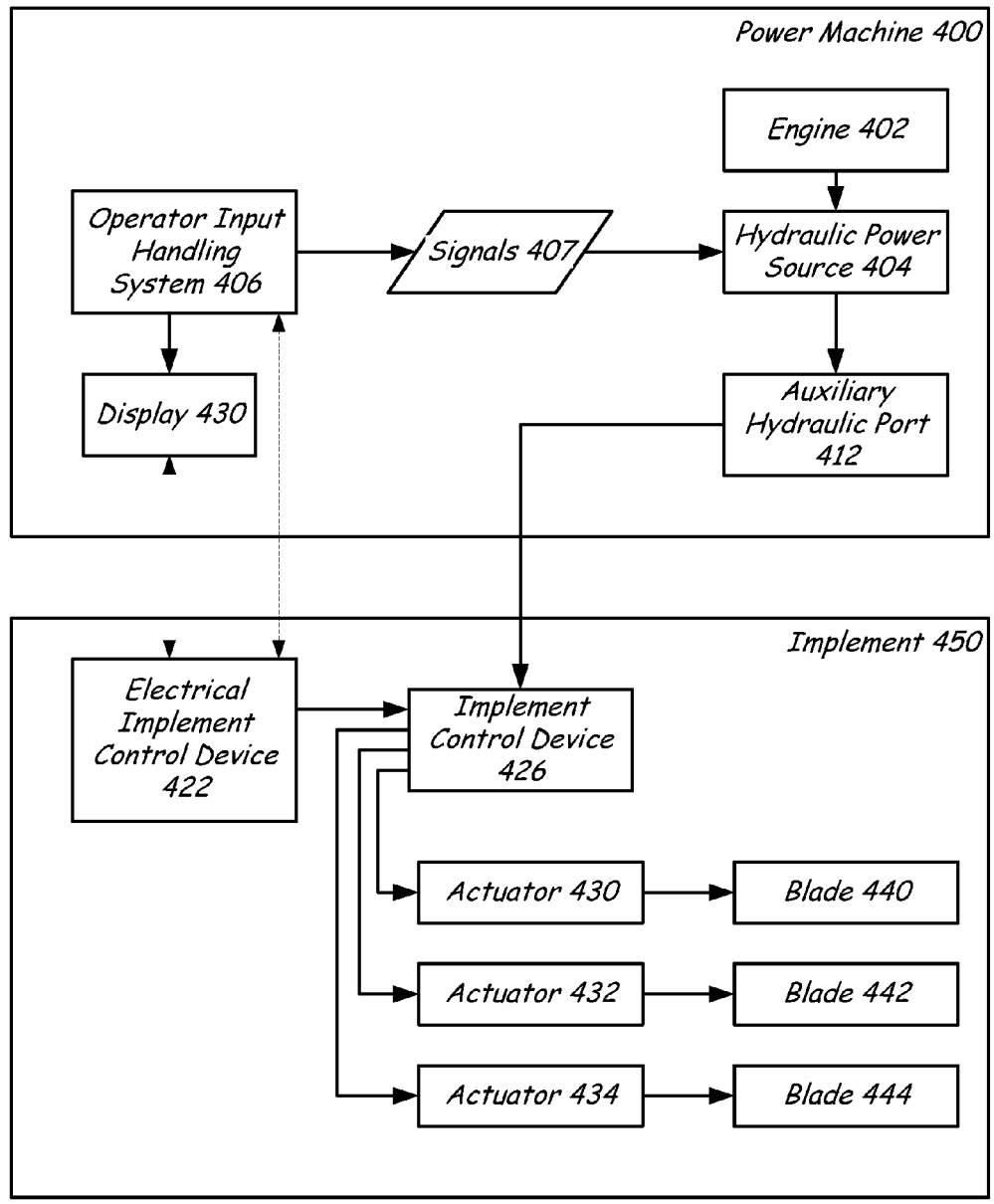
FIG. 11 is a block diagram illustrating a power machine that is operably coupled to a tree spade implement according to another illustrative embodiment.

FIG. 11 is a block diagram illustrating a power machine 400 that is operably coupled to a tree spade implement 450 according to another illustrative embodiment. Power machine 400 can be any of a number of different power machines such as the skid-steer loader illustrated in FIGS. 1 and 2.

Implement 450, as mentioned above is a tree spade implement, which is advantageously used to uproot and transplant trees. The implement 450 includes a plurality of blades 440, 442, and 444 that are capable of being positioned around the circumference of a tree that an operator wishes to transplant. While three blades are represented in FIG. 11, it should be appreciated that any number of blades can be incorporated into a tree spade implement without departing from the spirit and scope of the discussion. Each of the blades 440-444 is operably coupled to one of the actuators 430-434 that are capable of moving the blades 440-444 along an angled path so that the blades 440-444 engage soil around the base of the tree. When the blades 440-444 are fully extended, the spades generally converge with one another to extract the tree from the soil. Because each of the blades 440-444 is coupled to an individual actuator, each of the blades 440-434 can act independent of each of the other blades.

Power machine 400, as mentioned above, is similar or the same as power machine 10. FIG. 11 illustrates some of the same types of component as are shown in FIG. 3 and similar component have similar numbering, except that they are in the 400 series of reference designators. It should be appreciated that FIG. 11 illustrates only some components—those components discussed in conjunction with the illustrative embodiments—of power machine 400 for the sake of simplicity. Power machine 400 can include various other systems and components not described herein.

Engine 402 is coupled to a hydraulic power source 404, which provides hydraulic fluid to auxiliary hydraulic port 412, as required or requested. One way in which hydraulic fluid can be requested is via manipulation of control devices such as joysticks or switches on a handle. Such inputs are illustratively part of the operator input handling system 406. The operator input handling system 406 provides signals 407 to the hydraulic power source 404 that are indicative of operator inputs. In addition, the operator input handling system is in communication with display 430 and, when the trade spade implement is operably coupled to the power machine 400, with electrical implement control device 422. As with the embodiments discussed above relative to a grader, an operator may not be familiar with how tree spade implement 450 is to be controlled. That is, an operator may not be aware of which buttons, switches, or other devices are manipulated to control functions on the tree spade implement 450. In some embodiments, then, help screens of the type described above with respect to FIG. 7 are available to provide instruction to a user related to operation and control of tree spade 450. Such instruction illustratively includes words and/or graphics to point out which user actuated devices can be used to control various functions.

In addition, in some embodiments, the display 430 communicates information directly or via the controller 406 to the electronic interface control device 422. For example, it has been found that, especially in hard, compacted soil, moving each of the spades 440-444 individually in a timed pattern provides for the best way to place the spades into the ground for the purpose of extraction of a tree. Relying on an operator's manipulation of a control input for each blade leaves the operator with a difficult task. However, the electrical implement control device 422 is capable of entering a mode in which the electrical implement control device 422 sends a series of signals to the implement control device 426 of a preset duration and sequence to cause the actuators 430-434 to move the blades 440-444 in a timed pattern with the ultimate goal to get the blades 440-444 to cut through the soil around a tree.

In some embodiments, data indicative of the time period is stored in memory on the electrical implement control device 422. It may be advantageous to allow the user to change the time period stored in the electrical implement control device 422 to improve performance of implement. In one embodiment, the display 430 includes a screen page that prompts the user to set or change the time period that is stored in the electrical implement control device 422. Such a screen page can be accessed through a menu of screen pages that are available on the display 430, in response to inputs from the user that select from a menu of options. When the prompting screen page is shown to the user, one or more user-input devices are capable of receiving signals indicative of a user's desire to adjust the time period. This can be accomplished by "+" and "−" inputs, which increase and decrease, respectively, the length of the time pattern discussed above. Once the user has finished adjusting the time period, the display 430 illustratively provides a signal indicative of a new time period to the electrical implement control device 422, which stores the new time period information in memory within the electrical implement control device 422. Furthermore, in some embodiments, display 430 includes a screen that requests user input to start and/or stop the actuation of the blades 440-444 in a timed patter. When the user actuates a designated user actuation device, the display 430 sends a signal to the electrical implement control device 422 that causes the timed pattern actuation of the blades 440-44 to start or stop depending on which actuation devices was actuated.

In addition to providing instructional information and/or control signals via a display interface, in some embodiments the display interface provided in a power machine can display other information provided by an electrical implement control device that is not directly relation to the control of the implement. For example, in some embodiments, the electrical implement control device includes a job clock, which measures the amount of time that a particular implement is used. Whenever the implement is actively engaged in an activity, the job clock illustratively keeps track of the time that the implement is used and stores that time in the memory of the electrical implement control device. The display 430 can illustratively include a screen page that displays the stored value of the implement job clock. In addition, the display 430 illustratively includes a screen page that prompts the user to reset the implement job clock. This prompt can be in the same screen page as the screen page that displays the stored value of the implement job clock or it can be on another page. In some embodiments, the screen page that prompts the user to reset the implement job clock is password protected. Once the user successfully provides an input that indicates that the implement job clock is to be reset, the display 430 sends a signal to the electrical interface control device 422 to reset the implement job clock. This is accomplished by setting memory locations in the electrical interface control device 422 that store the implement job clock to an appropriate number.

The examples provided above illustrate examples of information provided to an operator via a display on a power machine related to operation of an implement operably coupled thereto. It should be appreciated that these are but illustrative examples and not an exhaustive description of all of the different display screens that can be employed. For example, a grader of the type that can be operably coupled to a power machine, and as discussed above not only has the capability of rotating its blade, but also raising and lowering the blade. Therefore, it should be appreciated that other display screens can be employed to illustrate instructions for such functions. Further, it should be appreciated that a number of different implements can be attached to power machines with electrical implement control devices that are capable of providing information related to display screens that can be shown on the display in a power machine for the purpose of providing instructional information or for prompting an operator to provide changes as desired for one or more parameters related to the operation of the implement.

The embodiments discussed above provide some important advantages. By providing a way for instructional information to be displayed within a power machine for any number of implement that might be operably coupled thereto, an operator can be quickly and easily educated about how to control implements that the operator might not otherwise be familiar with. In addition, because display information is provided by the implement to the power machine, the power machine is flexible enough to provide display screens related to new implements without requiring that resident memory devices or displays be updated, except as it relates to information being communicated between the implement and the power machine.

It should be appreciated that the above discussed embodiments are illustrative in nature and are not intended to limit the scope of this discussion. One of skill in the art will recognize that the features of various embodiments discussed herein can be applied to other implements so that an operator can receive operational information about said implements and have the opportunity to make operational adjustments for one or more functional characteristics of a work implement and communicate said adjustments to a remote module.

What is claimed:

1. A power machine having a frame, an engine supported by the frame, a cab supported by the frame that defines an operator compartment, an auxiliary power source capable of providing auxiliary power to an implement having an actuator thereon for performing a function that is operably coupled to the power machine, control input devices actuable by an operator that provide signals indicative of actuation thereof for controlling the actuator, the implement having an electronic controller that is in communication with the power machine, the power machine further comprising:

an operator interface including a display panel having a display accessible within the operator compartment for providing operational instructional information related to actuation of the control input devices for controlling the actuator on the implement to the operator, wherein the operator interface is configured to receive signals related to the provided instructional information, including information related to controlling the actuator via the control input devices, communicated by the electronic controller on the implement.

2. The power machine of claim 1 and further comprising:
a controller coupled to the display panel, wherein the controller is in communication with the implement.

3. The power machine of claim 2, wherein the controller is in communication with the operator interface and wherein signals communicated between the implement and the operator interface are passed through the controller.

4. The power machine of claim 2, wherein the controller is capable of identifying the type of implement that is operably coupled to the power machine from signals provided by the implement.

5. The power machine of claim 1, wherein the operator interface is capable of receiving signals communicated wirelessly from the implement.

6. The power machine of claim 1, wherein the display panel includes at least one operator actuable input and wherein the display is capable of communicating a status of the operator actuable input to the implement.

7. The power machine of claim 6, wherein the status of the operator actuable input impacts signals being provided to the power machine by the implement.

8. The power machine of claim 7, wherein the operator interface provides visual information to the operator in a menu-driven arrangement of pages of information to be displayed, and wherein receiving a signal indicative of actuation of the operator actuable input causes the implement to move to a different page.

9. The power machine of claim 1, wherein the signals received by the operator interface cause the display to provide the instructional information to the operator, with the instructional information related to actuation of the control input devices for controlling the function on the implement including an indication of which of the control input devices is to be manipulated to control the function.

10. The power machine of claim 1, wherein the implement has a plurality of controllable functions, the power machine includes a plurality of control input devices and wherein the instructional information provided by the display related to actuation of the control input devices includes an indication of which of the plurality of control input devices controls which of the plurality of controllable functions.

11. An implement capable of performing a task and being operably coupled to a power machine, wherein the implement receives a power source from the power machine to perform the task and further comprising:
an electrical device on the implement that is capable of communicating signals related to operational information including instructions for manipulating operator input devices configured to control a function on the implement with an operator interface on the power machine for providing the operational information to an operator.

12. The implement of claim 11, wherein the operator interface includes a visual display capable of displaying textual information to the operator.

13. The implement of claim 12, wherein the operator interface is attached to the power machine.

14. The implement of claim 11, wherein the operator interface includes an actuable input device and wherein the electrical device on the implement is capable of receiving signals indicative of whether the actuable input device is actuated.

15. The implement of claim 11 wherein the electrical device on the implement includes a memory device capable of storing operational information related to the implement and wherein the electrical device on the implement is capable of receiving signals from the operator interface and storing information in the memory device based on the received signals.

16. A method of providing operational information to an operator about controlling a function on an implement operably coupled to a power machine, comprising:
communicating information related to an operational instruction for controlling the fuction on the implement by manipulating operator input device on the power machine from a controller on the implement to an operator interface on the power machine; and
receiving the communicated information related to the operational instruction from the controller on the implement at the operator interface and displaying the communicated operational instructions for use to the operator, the instructions for use indicating how to manipulate operator input devices on the power machine to control the function on the implement.

17. The method of claim 16, wherein receiving communication from the controller on the implement includes receiving communication at a hand held device.

18. The method of claim 16 and further comprising:
communicating information related to a manually actuable input device from the display to the controller on the implement.

19. The method of claim 16 wherein communicating information includes communicating information to an operator interface on a work machine to which the implement is attached.

20. The method of claim 19, wherein communicating information to the operator interface includes communicating information to a controller that passes the information to the operator interface.

21. The method of claim 16, wherein communicating information related to an operational status includes communicating information about an operating parameter controlled by the controller on the implement.

22. The method of claim 16, wherein the providing operational information related to the implement including instructions for use includes indicating which of a plurality of operator input devices is to be manipulated to control the function.

23. The method of claim 16, wherein the implement includes a plurality of controllable functions, the power machine includes a plurality of operator input devices and wherein the providing operational information related to the implement including instructions for use includes indicating which of the plurality of operator input devices controls which of the plurality of controllable functions.

* * * * *